United States Patent Office 3,024,245  
Patented Mar. 6, 1962

3,024,245  
PROCESS FOR PRODUCING PYRIDOXINE AND INTERMEDIATES  
Peter I. Pollak, Scotch Plains, N.J., assignor to Merck & Co. Inc., Rahway, N.J., a corporation of New Jersey  
No Drawing. Application Oct. 17, 1957, Ser. No. 690,635, now Patent No. 2,948,733, dated Aug. 9, 1960, which is a division of application Ser. No. 621,983, Nov. 14, 1956, now Patent No. 2,904,551, dated Aug. 17, 1957. Divided and this application Oct. 19, 1959, Ser. No. 847,075  
3 Claims. (Cl. 260—295)

This application is a division of my copending application Serial No. 690,635 (now U.S. Patent No. 2,948,733), filed October 17, 1957 which in turn is a division of application Serial No. 621,983 now issued as U.S. Patent 2,904,551.

This invention relates to processes for the production of pyridoxine (i.e., Vitamin $B_6$), and it is also concerned with the preparation of novel chemical compounds produced as intermediates in the synthesis of pyridoxine.

It is an object of this invention to provide an economical and convenient method for synthesizing pyridoxine, and to provide a series of novel intermediates.

In preparing pyridoxine I utilize as one of the starting materials, a derivative of pyruvic acid, which has the structural formula—

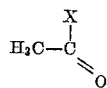

or

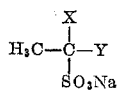

wherein X is carb-alkoxy or cyano and Y is hydroxy or cyano.

The above compound is reacted with a glycinate ester which has the formula—

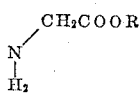

wherein R is a lower alkyl group to form a compound of the formula—

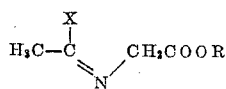

or

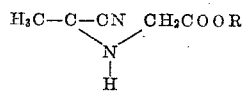

wherein X and R are as above.

The above compound is reacted with a 1,4-disubstituted butanone-2 ether in which both hydroxyl groups are etherified, either with lower alkyl groups such as methyl or ethyl, aryl or aralkyl groups such as benzyl or esterified with acyl groups such as acetyl or benzoyl to form the straight-chain dimethyl, diethyl, dibenzyl or diacetyl derivatives of 1,4-disubstituted butanone-2 or in which both hydroxyl groups are etherified with each other to form a cyclic inner ether, i.e., 3-keto-tetrahydrofurane. These 1,4-disubstituted butanone-2 compounds have the following structure:

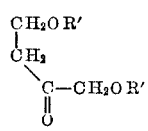

or

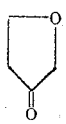

wherein R' is alkyl, aryl, aralkyl or acyl, to produce a pyridine derivative having the following structure:

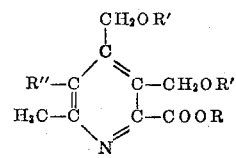

or

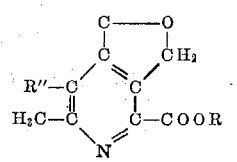

wherein R and R' are as above and R'' is hydroxy or amino. These compounds can readily be converted to pyridoxine.

Alternatively, the pyruvate derivative, the glycinate ester and the 1,4-disubstituted butanone-2 compound can be reacted simultaneously to form the pyridine derivative described above.

In accordance with one embodiment of this invention, ethyl pyruvate, sodium bisulfite, sodium cyanide and ethyl glycinate are reacted to form ethyl-α-carbethoxymethylamino-α-methylcyanoacetate. The latter compound is reacted with 1,4-dimethoxybutanone-2 and 2-methyl - 3 - hydroxy - 4,5 - bis(methoxymethyl) - 6 - carbethoxypyridine is recovered.

This latter compound is acidified with dilute hydrochloric acid and heated in an autoclave at elevated temperatures to form pyridoxine hydrochloride.

The synthesis of pyridoxine and the novel intermediate chemical compounds obtained and the process may be illustrated by the following specific examples. It should be noted, of course, that these examples are intended to be illustrative of the methods and procedures utilized in preparing these compounds and that it is not intended to be restricted or to be regarded as embodying the only way in which my novel chemical compounds may be formed and recovered.

Example 1

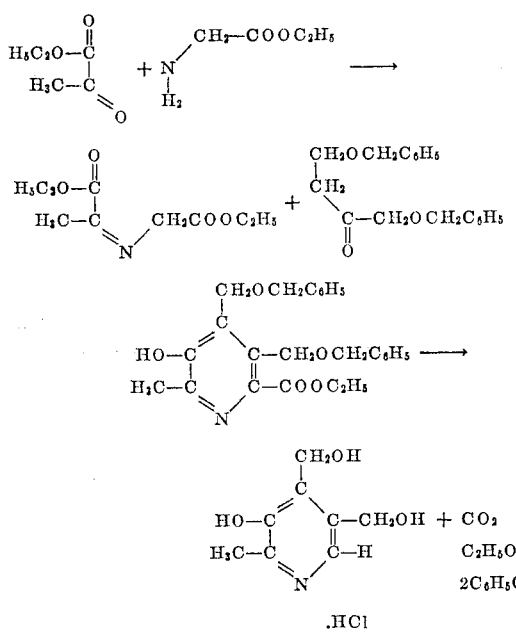

116 parts of ethyl pyruvate and 103 parts of ethyl glycinate were dissolved in anhydrous methyl alcohol containing a trace of anhydrous hydrochloric acid. After standing at ambient temperature for 2 hours, the solvent was removed by vacuum distillation and a viscous oil of ethyl-α-carbethoxymethyliminopyruvate was recovered.

201 parts of the ethyl-α-carbethoxymethylimino- pyruvate and 284 parts of 1,4-dibenzyloxybutanone-2 were dissolved in anhydrous methyl alcohol. To this solution was added 25 parts of anhydrous sodium carbonate and the mixture was agitated at 50° C. for 12 hours in a nitrogen atmosphere. The solvent was removed by vacuum distillation. The residue contained 2-methyl-3-hydroxy - 4,5 - bis(benzyloxymethyl) - 6 - carbethoxy-pyridine.

The 2-methyl-3 - hydroxy-4,5 - bis(benzyloxymethyl)- 6-carbethoxy-pyridine thus obtained was acidified with dilute hydrochloric acid. To the resulting solution was added 2 parts of charcoal and the mixture was agitated and then filtered. The filtrate was placed in an autoclave and the temperature maintained at 155° C. for three hours. After vacuum dehydration, the amorphous brown residue was recrystallised from hot water to yield pyridoxine hydrochloride.

Example 2

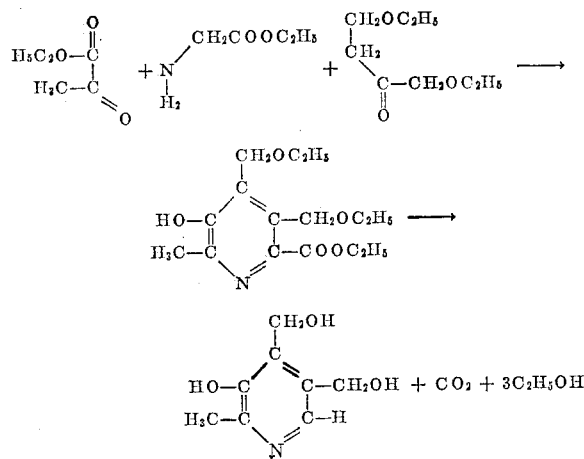

116 parts of ethyl pyruvate, 103 parts of ethyl glycinate and 160 parts of 1,4-diethoxybutanone-2 were dissolved in anhydrous methyl alcohol. To this solution was added 20 parts of anhydrous sodium carbonate and the mixture was agitated at 50° C. for 12 hours in a nitrogen atmosphere. The solvent is removed by vacuum distillation to form a residue of 2-methyl-3-hydroxy-4,5-bis(ethoxymethyl)-6-carbethoxypyridine.

The crude residue of 2-methyl-3-hydroxy-4,5-bis-(ethoxymethyl)-6-carbethoxy pyridine thus obtained was acidified with dilute hydrochloric acid. To the resulting solution was added 2 parts of charcoal and the mixture was agitated and then filtered. The filtrate was placed in an autoclave and the temperature maintained at 155° C. for three hours. After vacuum dehydration, the amorphous brown residue was recrystallized from hot water to yield pyridoxine hydrochloride.

Example 3

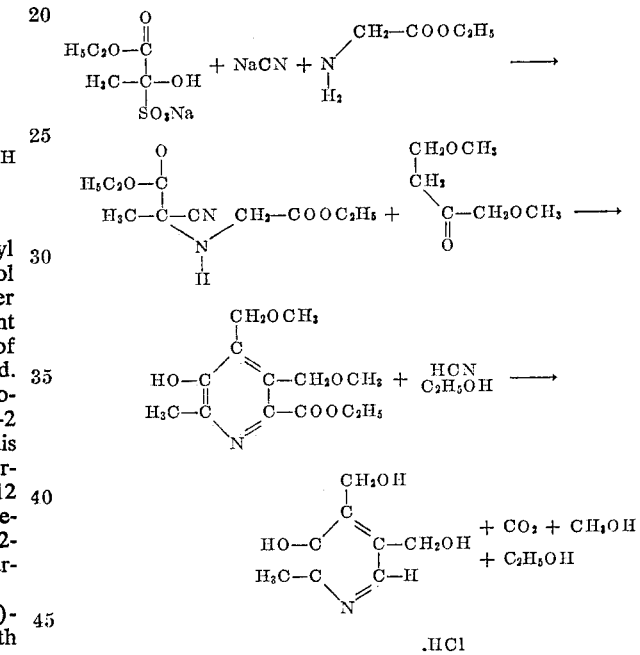

197 parts of the bisulfite addition product of ethyl pyruvate, 30 parts of sodium bisulfite, 50 parts of sodium cyanide, and 103 parts of ethyl glycinate were dissolved in water. After 8 hours standing at room temperature, an oily layer was separated. The aqueous layer was extracted with ether. The ether extracts were combined with the oil and dried over sodium sulfate and distilled to yield ethyl-α-carbethoxymethylamino-α-methylcyanoacetate.

228 parts of ethyl-α-carbethoxymethylamino-α-methyl- cyanoacetate and 132 parts of 1,4-dimethoxybutanone-2 were dissolved in anhydrous pyridine to which was added 5 parts of dry sodium methoxide. After 24 hours the mixture was vacuum distilled to dryness to form a brown oily residue containing 2-methyl-3-hydroxy-4,5-bis(methoxymethyl)-6-carbethoxypyridine.

Water was added to the brown oily residue of 2-methyl-3-hydroxy - 4,5-bis(methoxymethyl)-6 - carbethoxypyridine and charcoal was added to the aqueous suspension. The mixture was filtered. The filtrate was acidified with dilute hydrochloric acid and heated in an autoclave at 155° C. for three hours. Charcoal was added to the reaction solution and the mixture was filtered. The filtrate was vacuum concentrated to dryness. The resulting crystalline solid was recrystallized from hot water. The crystals melted at 205–206° C. and were identified as pyridoxine hydrochloride.

Example 4

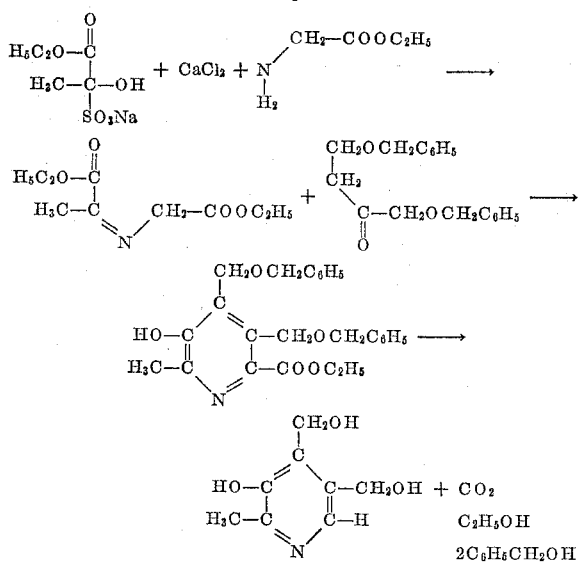

197 parts of the bisulfite addition product of ethyl pyruvate and 103 parts of ethyl glycinate were dissolved in anhydrous diethyl ether containing 30 parts of anhydrous calcium chloride. The mixture was allowed to stand at room temperature for 2 hours. The mixture was filtered and the solvent removed in vacuo to yield an oily product of ethyl-α-carbethoxymethyliminopyruvate.

201 parts of ethyl-α-carboethoxymethyliminopyruvate thus obtained and 284 parts of 1,4-dibenzyloxybutanone-2 were dissolved in anhydrous methyl alcohol. To this solution was added 30 parts of anhydrous sodium carbonate and the mixture was agitated at 50° C. for 12 hours in a nitrogen atmosphere. The solvent was removed by vacuum distillation to yield 2-methyl-3-hydroxy-4,5-bis(benzyloxymethyl)-6-carbethoxypyridine.

The residue of 2-methyl-3-hydroxy-4,5-bis(benzyloxymethyl)-6-carbethoxypyridine was acidified with dilute hydrochloric acid. To the resulting solution was added 2 parts of charcoal and the mixture was agitated and then filtered. The filtrate was placed in an autoclave and the temperature maintained at 155° C. for 3 hours. After vacuum dehydration the amorphous brown residue was recrystallized from hot water to yield pyridoxine hydrochloride.

Example 5

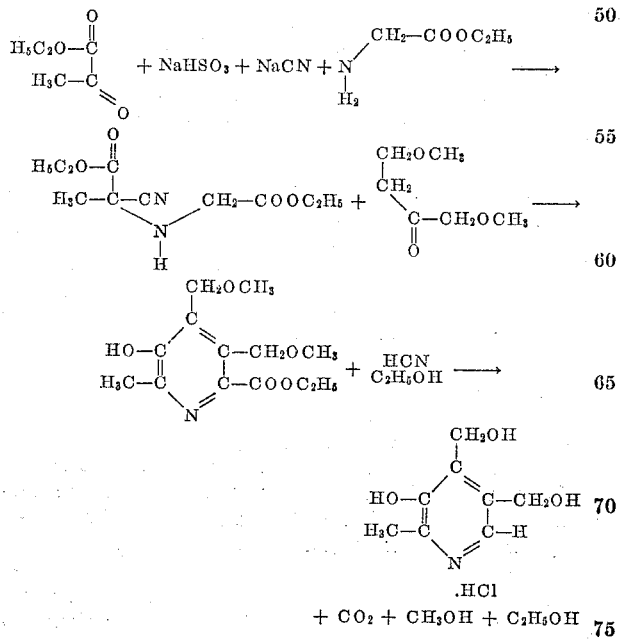

116 parts of ethyl pyruvate, 120 parts of sodium bisulfite, 52 parts of sodium cyanide, and 103 parts of ethyl glycinate were dissolved in water. After 8 hours standing at room temperature, an oily layer was separated and the aqueous layer was extracted three times with 100 parts of diethyl ether. The ether extracts were combined with the oil and dried over sodium sulfate and distilled to yield ethyl-α-carbethoxymethylamino-α-methylcyanoacetate.

228 parts of ethyl-α-carbethoxymethylamino-α-methylcyanoacetate and 132 parts of 1,4-dimethoxybutanone-2 were dissolved in anhydrous pyridine to which was added 5 parts of dry sodium methoxide. After twenty-four hours at room temperature the mixture was vacuum distilled to dryness. The brown oily residue contained 2-methyl-3-hydroxy-4,5-bis(methoxymethyl)-6-carbethoxypyridine. Water was added to the 2-methyl-3-hydroxy-4,5-bis(methoxymethyl)-6-carbethoxypyridine oily residue and charcoal was added to the resulting aqueous suspension. The mixture was filtered. The filtrate was acidified with dilute hydrochloric acid and heated in an autoclave to 155° C. for 3 hours. Charcoal was added to the resulting solution and the mixture was filtered. The filtrate was vacuum concentrated to dryness. The resulting crystalline solid was recrystallized from hot water. The crystals melted at 205–206° C. and were identified as pyridoxine hydrochloride.

Example 6

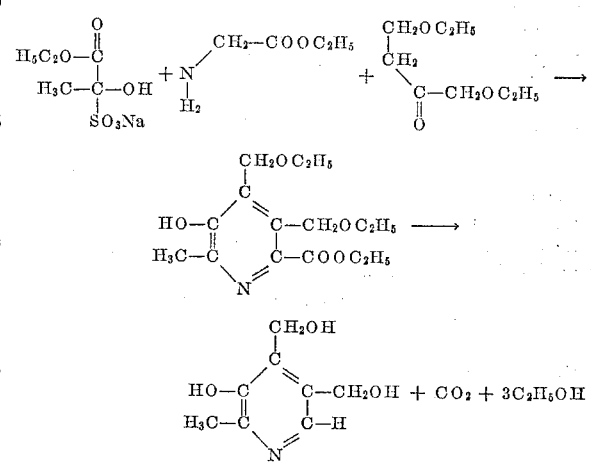

197 parts of the bisulfite addition product of ethyl pyruvate, 103 parts of ethyl glycinate and 160 parts of 1,4-diethoxybutanone-2 were dissolved in anhydrous methyl alcohol. To this solution was added 15 parts of anhydrous sodium carbonate and the mixture was agitated at 50° C. for 12 hours in a nitrogen atmosphere. The solvent was removed by vacuum distillation and the residue contained 2-methyl-3-hydroxy-4,5-bis(ethoxymethyl)-6-carbethoxy pyridine.

The 2-methyl-3-hydroxy-4,5-bis(ethoxymethyl)-6-carbethoxy pyridine was acidified with hydrochloric acid. To the resulting solution was added 2 parts of charcoal and the mixture was agitated and then filtered. The filtrate was placed in an autoclave and the temperature maintained at 155° C. for three hours. After vacuum dehydration, the amorphous brown residue was recrystallized from hot water to yield pyridoxine hydrochloride.

Example 7

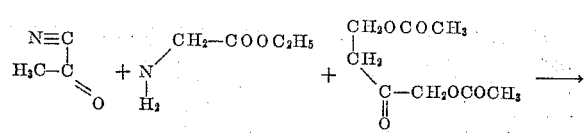

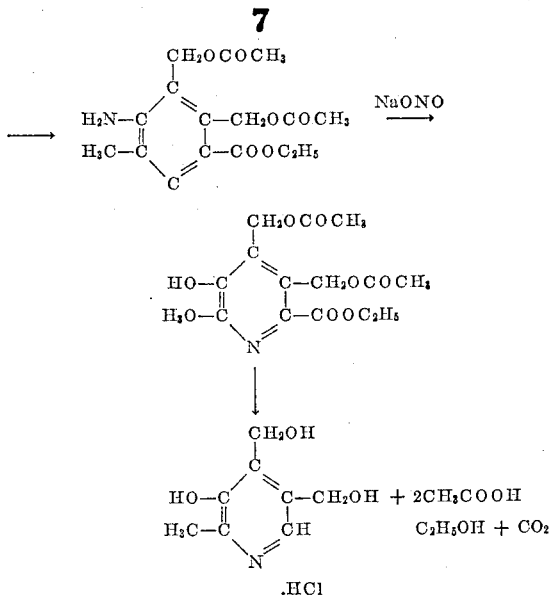

69 parts of acetyl cyanide, 103 parts of ethyl glycinate and 188 parts of 1,4-diacetoxybutanone-2 were dissolved in anhydrous dioxane. To this solution was added 1 part of powdered sodium hydroxide and the mixture was agitated at room temperature for 24 hours. The solvent was removed by vacuum distillation to form a residue containing 2 - methyl - 3 - amino - 4,5 - bis(acetoxymethyl)-6-carbethoxypyridine.

To the residue of 2-methyl-3-hydroxy-4,5-bis(acetoxymethyl)-6-carbethoxypyridine was added hydrochloric acid. 69 parts of sodium nitrite were then added at 75° C. and the resulting solution placed in an autoclave at 155° C. for three hours. After autoclaving the solution was mixed with 1 part charcoal. The mixture was filtered and the vacuum filtrate concentrated to dryness. The residue was recrystallized from hot water to yield pyridoxine hydrochloride.

*Example 8*

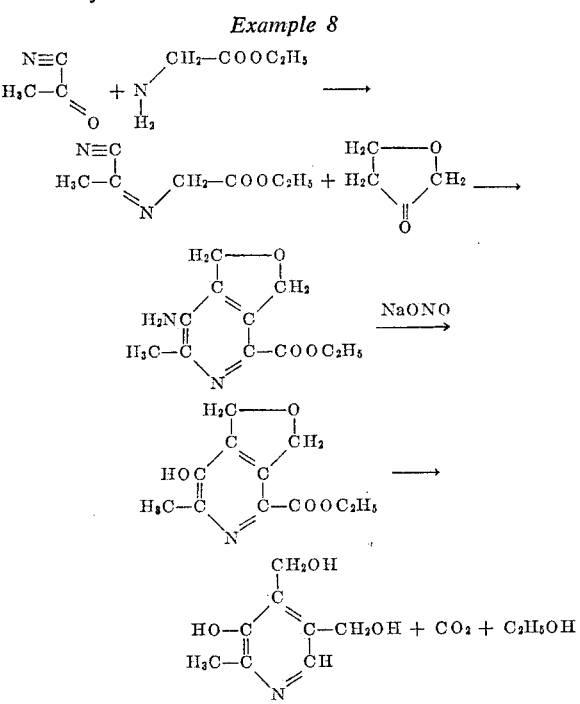

69 parts of acetyl cyanide were dissolved in anhydrous pyridine and 103 parts of ethyl glycinate were added. After standing for four hours at room temperature the solvent was distilled from the mixture to yield an oil containing α-carbethoxymethylimino-propionitrile.

This oil was dissolved in anhydrous ether and 86 parts of 3-ketotetrahydrofurane was added to the mixture in the presence of trimethylbenzylammoniumhydroxide. The mixture was heated at reflux temperatures for a period of 40 hours. The ether was removed by distillation to yield a residue containing 6-methyl-7-amino-4-carbethoxy-1,3-dihydrofuro-[3.4-c]pyridine.

This residue was acidified with dilute hydrochloric acid. 69 parts of sodium nitrite were added to the mixture and it was heated at 75° C. for three hours to form 6-methyl-7 - hydroxy - 4 - carbethoxy - 1,3 - dihydrofuro - [3.4 - c]pyridine. The solution was autoclaved and then charcoal was added. The mixture was filtered and the vacuum filtrate concentrated to dryness. The residue was recrystallized from hot water to yield pyridoxine hydrochloride.

*Example 9*

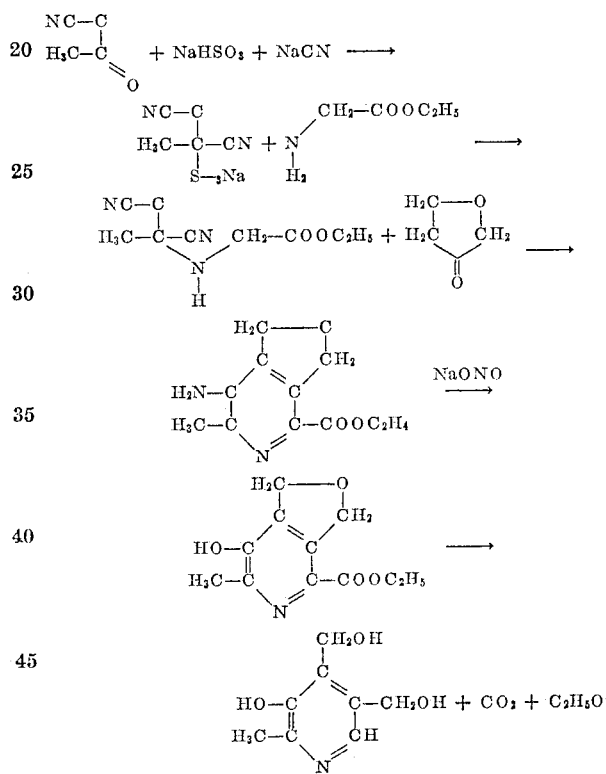

To an ether solution of 69 parts of acetyl cyanide was added 120 parts of sodium bisulfite and 52 parts of sodium cyanide. After five hours of agitation at room temperature, this mixture was filtered. The filtrate contained the bisulfite addition product of ethyl pyruvate.

To the bisulfite addition product of ethyl pyruvate filtrate was added 103 parts of ethyl glycinate and 10 parts of piperidinium acetate. This solution was refluxed on a steam bath for 12 hours. The ether was then removed by distillation and the residue contained α-carbethoxymethyl-amino-α-methylmalononitrile.

This residue was dissolved in anhydrous ether and 86 parts of 3-ketotetrahydrofurane was added to the mixture in the presence of trimethylbenzyl ammonium hydroxide at reflux temperature for a period of 40 hours. The ether was removed by distillation leaving 6-methyl-7-amino-4-carbethoxy-1,3-dihydrofuro[3.4-c]pyridine.

This residue was acidified with dilute hydrochloric acid. 69 parts of sodium nitrite were then added and the mixture heated at 75° C. for three hours to form 6-methyl-7-hydroxy-4-carbethoxy-1,3-dihydrofuro[3.4-c]pyridine.

The solution was autoclaved and then charcoal was added to the mixture. The mixture was filtered and the vacuum filtrate concentrated to dryness. The residue was

Example 10

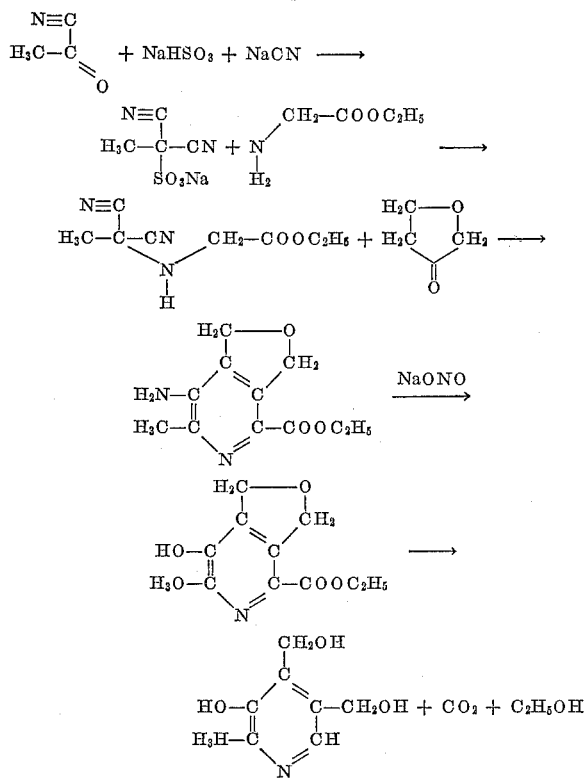

173 parts of the bisulfite addition product of acetyl cyanide were suspended in anhydrous pyridine and treated with 103 parts of ethyl glycinate. After four hours standing at room temperature the ether was distilled to yield an oil containing α-carbethoxymethylamino-α-methylmalononitrile.

This oil was dissolved in anhydrous ether and treated with 86 parts 3-ketotetrahydrofurane in the presence of trimethylbenzyl ammonium hydroxide at reflux temperatures for a period of 40 hours to form 6-methyl-7-amino-4-carbethoxy-1,3-dihydrofuro-[3,4-c]pyridine. The ether is removed by distillation and the residue is treated in accordance with the procedure given in Example 9 to give pyridoxine hydrochloride.

Various changes and modification may be made in carrying out the present invention without departing from the spirit and scope thereof. Insofar as these changes and modifications are within the purview of the annexed claims, they are to be considered as part of this invention.

I claim:

1. A process that comprises intimately contacting a pyruvic acid derivative of the formula:

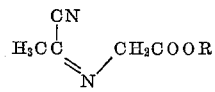

with a lower alkyl ester of glycine to form an intermediate compound of the formula

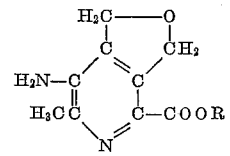

wherein R is a lower alkyl group intimately contacting this compound with 3-ketotetrahydrofurane and heating to form a pyridine compound of the formula $$\text{H}_2\text{N-C} \quad \text{H}_3\text{CC} \quad \text{C-COOR}$$

wherein R is the same as above, treating this compound with sodium nitrite in the presence of hydrochloric acid and subjecting the resulting reaction product to acid hydrolysis at elevated temperature and pressure to produce pyridoxine.

2. The process that comprises intimately contacting acetyl cyanide and ethyl glycinate to form 2-carbethoxymethyliminopropionitrile, intimately contacting the latter compound with 3-ketotetrahydrofurane and heating to form 6-methyl-amino-4-carbethoxy-1,3-dihydrofuro-[3,4-c]pyridine, intimately contacting the latter compound with sodium nitrite in an acidic medium to form 6-methyl-7-hydroxy - 4 - carbethoxy - 1,3 - dihydrofuro - [3.4 - c]pyridine, and subjecting the latter compound to acid hydrolysis at elevated temperature and pressure to yield pyridoxine.

3. A process that comprises intimately contacting a pyruvic acid derivative of the formula

with a lower alkyl ester of glycine to form an intermediate compound of the formula

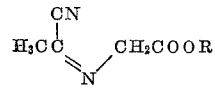

wherein R is a lower alkyl group, intimately contacting this compound with 3-ketotetrahydrofurane and heating to form a pyridine compound of the formula

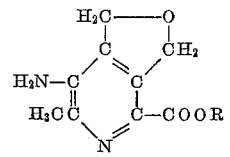

wherein R is the same as above.

References Cited in the file of this patent

UNITED STATES PATENTS

| | | |
|---|---|---|
| 2,680,743 | Stevens | June 8, 1954 |
| 2,734,063 | Stevens | Feb. 7, 1956 |
| 2,904,551 | Pollak | Sept. 15, 1959 |